(12) United States Patent
Anglin et al.

(10) Patent No.: US 8,352,540 B2
(45) Date of Patent: Jan. 8, 2013

(54) DISTINGUISHING DATA STREAMS TO ENHANCE DATA STORAGE EFFICIENCY

(75) Inventors: Matthew Joseph Anglin, Tucson, AZ (US); Avishai Haim Hochberg, San Jose, CA (US); James Patrick Smith, Redwood City, CA (US); Neil Gregory Rasmussen, Livermore, CA (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 12/043,797

(22) Filed: Mar. 6, 2008

(65) Prior Publication Data
US 2009/0228599 A1    Sep. 10, 2009

(51) Int. Cl.
G06F 15/16     (2006.01)
G06F 15/173    (2006.01)
G06F 17/00     (2006.01)
G06F 13/00     (2006.01)

(52) U.S. Cl. ......... 709/201; 709/226; 707/640; 711/162

(58) Field of Classification Search .................. 709/201, 709/217, 220, 226; 711/162; 707/100
See application file for complete search history.

(56) References Cited

U.S. PATENT DOCUMENTS

| | | | |
|---|---|---|---|
| 6,510,156 B1 | 1/2003 | Brock et al. | |
| 6,865,655 B1* | 3/2005 | Andersen | 711/162 |
| 7,013,455 B1 | 3/2006 | Ku et al. | |
| 7,152,055 B2 | 12/2006 | Loschky et al. | |
| 7,478,101 B1* | 1/2009 | Manley | 707/100 |
| 2005/0144283 A1* | 6/2005 | Fatula, Jr. | 709/226 |
| 2005/0288861 A1 | 12/2005 | Abraham et al. | |
| 2006/0085236 A1 | 4/2006 | Smith et al. | |
| 2007/0136239 A1 | 6/2007 | Lee et al. | |
| 2007/0208834 A1* | 9/2007 | Nanamura et al. | 709/220 |

FOREIGN PATENT DOCUMENTS

| | | |
|---|---|---|
| GB | 2 378 789 A | 2/2003 |
| JP | 2004229231 | 8/2003 |
| JP | 2003323428 | 11/2003 |
| WO | WO 02/088885 A2 | 11/2002 |

* cited by examiner

*Primary Examiner* — Ian N Moore
*Assistant Examiner* — Kiet Tang
(74) *Attorney, Agent, or Firm* — Century IP Group, Inc.; F. Jason Far-hadian, Esq.

(57) ABSTRACT

Systems, methods, and computer products for communicating between a client and server by identifying and separating file data streams within a file are provided. The method comprises indicating the type of file data stream to be transmitted and transmitting the indicated file data stream. The transmitted file data stream is compared with a stored data stream. A non-redundant file data stream is stored based upon the outcome of the comparison. The transmitted file data stream and stored data stream may be compared according to a deduplication table based on data stream profiles.

17 Claims, 9 Drawing Sheets

```
#define STREAM_TYPE_NTFS_SECURITY_DATA
#define STREAM_TYPE_NTFS_ALTERNATE_DATA
#define STREAM_TYPE_UNIX_ACL_DATA
#define STREAM_TYPE_NTFS_ACL_DATA
...
#define STREAM_TYPE_FILE_DATA
sending object "filename.filetype"
sending data for file stream type
STREAM_TYPE_NTFS_SECURITY_DATA
sending data
sending data for file stream type
STREAM_TYPE_NTFS_ALTERNATE_DATA
sending data
sending data for file stream type
STREAM_TYPE_FILE_DATA
sending data
done sending data
```

```
#define STREAM_PROFILE_WITHIN_NAMESPACE
          // stream should de-duplicate
well within namespace
#define STREAM_PROFILE_ACROSS_SIMILIAR
          // stream should de-duplicate
well across namespaces        // of
similar OS or file system
#define STREAM_PROFILE_ACROSS_DIFFERENT
          // stream should de-duplicate
well across namespaces        // of
dissimilar OS or file systems typedef streamTable
{STREAM_TYPE_NTFS_SECURITY_DATA,
STREAM_PROFILE_ACRROS_SIMILIAR},
{STREAM_TYPE_UNIX_ACL_DATA,
STREAM_PROFILE_ACROSS_SIMILIAR),
...
{STREAM_TYPE_FILE_DATA,
STREAM_PROFILE_ACROSS_DIFFERENT};
```

DISTINGUISHING DATA STREAMS TO ENHANCE DATA STORAGE EFFICIENCY

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to network computing environments and, more particularly, to methods, systems and computer products for communicating between a client and server by identifying and separating data streams within a file to enhance data storage efficiency.

BACKGROUND

Data deduplication is an efficient data storage method used to eliminate or reduce redundant data, such that one unique instance of the data is retained on storage media instead of multiple instances of the same. Typically, the multiple instances are replaced with a pointer to a single instance. For example, a typical email system might contain 100 instances of the same file attachment. If the email platform is backed up or archived without deduplication, all 100 instances are saved. When data deduplication is utilized, only one instance of the attachment is actually stored. Each subsequent instance is referenced back to the one saved copy.

Thus, data deduplication promotes more efficient use of disk space and as a result reduces storage costs and also allows for longer disk retention periods. This approach also provides for better recovery time objectives and reduces the need for tape backups. Data deduplication also reduces the data that must be sent across a wide area network (WAN) for remote backups, replication, and disaster recovery.

In a network backup environment, a client system may backup data in a remote storage device over a network and coordinate the backup with a storage management server. For instance, the International Business Machines (IBM®) Tivoli® Storage Manager product provides software for a client and server systems to backup client data (IBM and Tivoli are registered trademarks of IBM). The client transfers files from its file system to the storage management server. The storage management server maintains a backup database having information on files sent to the storage management server.

When a file (i.e., data stream) is sent from the client to the server, there are file attributes (e.g., file size, file modification time, etc.) and ancillary data streams associated with the file (e.g., access control lists, extended attribute streams, generic alternate data streams, etc.) that are sent to the storage management server. The ancillary data streams associated with a file are usually unbounded in size and therefore cannot be stored as attributes in a database. Instead, the ancillary data streams are typically stored in the disk/tape storage. Therefore, these data streams are transmitted within the file's data stream.

The placement of the ancillary data streams in the file is arbitrary. That is, the ancillary data streams may be positioned in front of the file data or after the file data during data transmission. Additionally, these data streams may be different from machine to machine even if the data file is the same. For example, two users that have the exact same data file (e.g., a text file with the same content) may have different metadata (e.g., ownership, permission, creation date, etc.) associated with the respective file. Thus, the two data files will have similar data sections (i.e., including the same text content) and different metadata sections (i.e., including different information for ownership, permission creation date, etc.).

In the current systems, the storage management server lacks knowledge of what portion of the data file includes file data and what portion includes metadata or data related to the ancillary data streams. The current technique for deduplication involves comparing data chunks using brute force or a hashing algorithm, which is inefficient. Methods and systems are needed that can overcome the aforementioned shortcomings.

SUMMARY

The present disclosure is directed to systems, methods and corresponding products that facilitate data storage efficiency by identifying and separating file data streams within a file.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for communicating between a client and server by identifying and separating file data streams within a file is provided. The method comprises indicating the type of file data stream to be transmitted and transmitting the indicated file data stream. The transmitted file data stream is compared with a stored data stream. A non-redundant transmitted file data stream is stored based upon the outcome of the comparison. The transmitted file data stream and stored data stream may be compared according to a deduplication data structure based on data stream profiles.

In accordance with one embodiment, a storage management system is provided. The system comprises a server and a client that communicate over a network. The client is configured to transmit a file and identify data streams included in the file prior to transmission. The server is configured to receive a transmitted file and processing data streams for redundancies. The server may then store non-redundant data streams. In a preferred embodiment, the client or the server implements deduplication by creating and maintaining a data structure of data stream profiles, and comparing to be transmitted or transmitted data streams with stored data streams according to the data structure.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate identifying and separating file data streams within a file to enhance efficiency in data storage. For a given file, the file attributes, file streams, and file data may be separately identified and communicated to a server. The server may be configured to implement deduplication efficiently.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
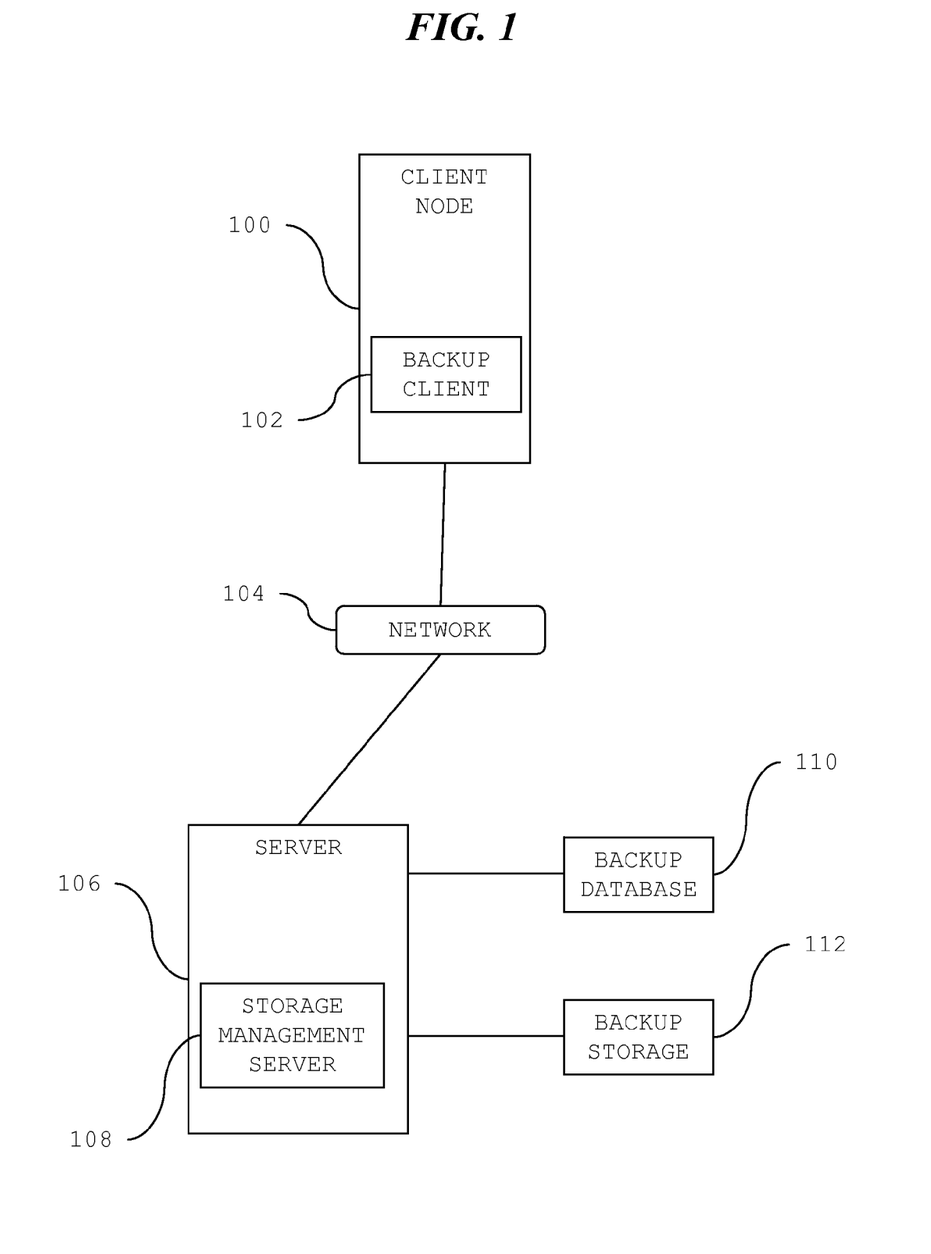
FIG. 1 illustrates a client-server network environment in accordance with one embodiment in which client data can be backed up using a server.

Referring to FIG. 1, a client node 100 comprises a computing system including a backup client 102 that coordinates backup and archival operations with a storage management server 108. Backup client 102 and storage management server 108 may comprise hardware or logic code executed on server 106 (or the client node 100). The backup client 102 may transfer files from the client node 100 over a network 104 to the storage management server 108. The storage management server 108 may back up or archive client files in a backup storage 112. The storage management server 108 may store other file information associated with the files, such as file metadata or file attributes, in a backup database 110, for example.

One or more client nodes 100 may communicate with the storage management server 108 and may comprise computational devices such as desktop computers, workstations, mainframes, etc. The backup storage 112 may comprise a storage system including a plurality of storage devices, e.g., interconnected hard disk drives, a redundant array of independent disks (RAID), just a bunch of disks (JBOD), a direct access storage device (DASD), disks connected in a loop configuration, a tape library, an optical library, a network attached storage (NAS), etc.

The network 104 may comprise a wide area network (WAN), local area network (LAN), storage area network (SAN), wireless network, internet, intranet, peer-to-peer network, etc. The backup client 102 and storage management server 108 may comprise logic code included with client-server backup programs offered by different vendors (e.g., IBM Tivoli Storage Manager product).

Figure 2A:
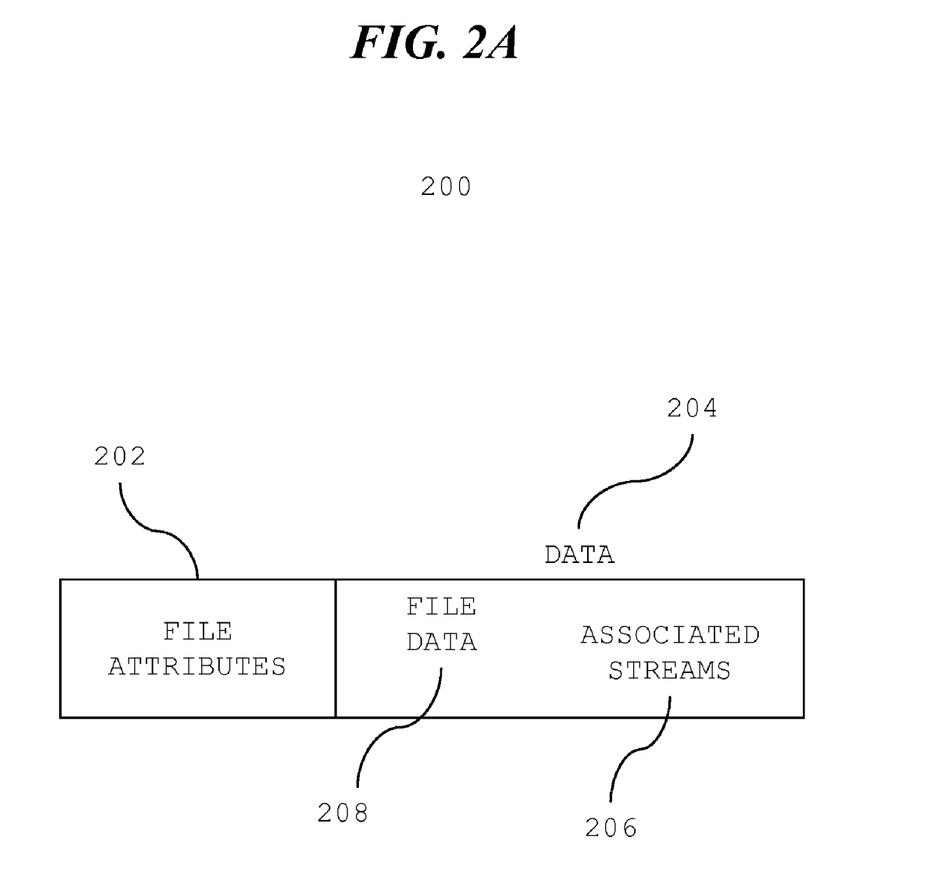
FIGS. 2A and 2B are block diagrams of exemplary file data streams in accordance with one or more embodiments.

Referring to FIG. 2A, a file object 200 sent from a backup client 102 to a storage management server 108 may comprise file attributes 202 and data 204. The file attributes 202 may comprise a number of different attributes that are associated with the file object 200 (e.g. file size, file modification time, file owner, etc.). File attributes 202 may be fixed in size and may be stored in a small, fixed number of bytes. When a file object 200 is sent from a backup client 102 to a storage management server 108, file attributes 202 may be sent and managed separately from the data 204. For example, using a storage management system in accordance with the network computing environment of FIG. 1, file attributes 202 may be stored separately or as metadata in a backup database 110.

In some embodiments, data 204 in the file object 200 may be potentially large and unpredictable in size. Thus, it may be impractical to use a backup database 110 for this information. The data 204 in the file object 200 includes the file data 208 (comprising the actual content of the file object 200), and associated streams 206 (comprising other characteristics and information associated with the file object 200). The associated streams 206 may correspond to access control lists (ACLs), extended attributes (which may contain additional information such as the author's name for a word processing document), or other characteristics that require a large or variable number of bytes. Associated streams 206 for the file object 200 may be unbounded in size and therefore using a database 110 to store the associated streams 206 may be impractical and inefficient.

In the file data stream of FIG. 2A, location and placement of the file data 208 and the associated streams 206 within the data 204 may be arbitrary. For example, during a transfer of a file object 200 from a backup client 102 to a storage management server 108, the associated streams 206 can be streamed before or after the file data 208.

Figure 2B:
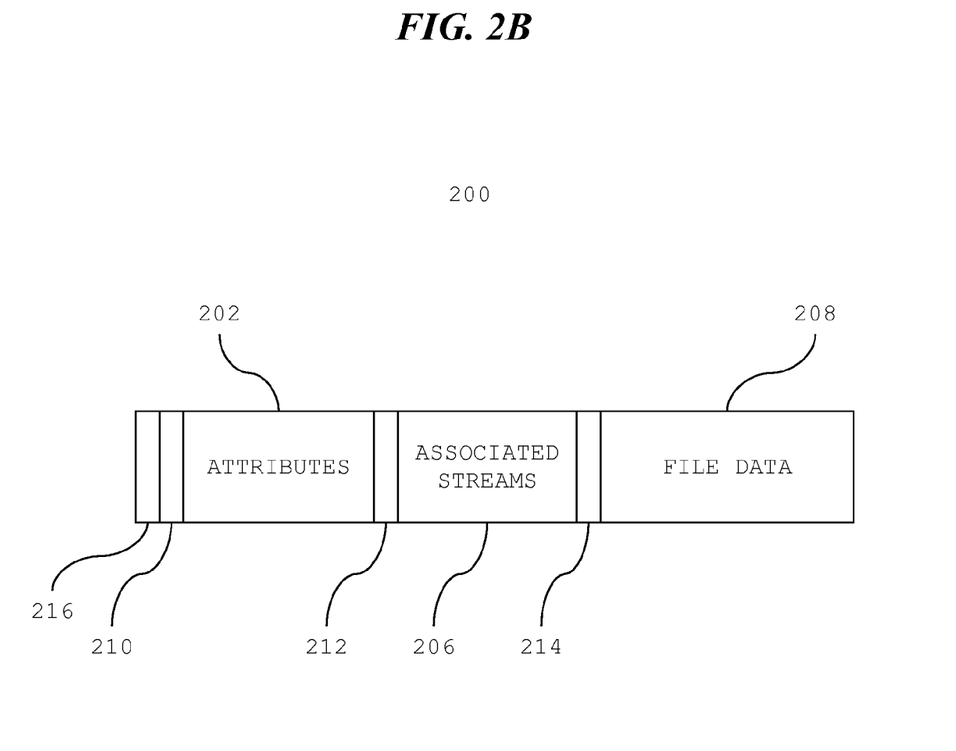

Referring now to FIG. 2B, an alternative file data stream for backup purposes in accordance with one embodiment is shown. In this exemplary embodiment, file data 208 comprises the actual content of the file object 200 being sent from a backup client 102 to a storage management server 108. The associated streams 206 are separated from the file data 208, such that file data 208 and associated streams 206 may be tagged separately for the purpose of identification.

A tag 210 may, for example, identify the file attributes 202. An additional tag 212 may, for example, identify one or more associated streams 206, along with a tag 214 identifying the file data 208. In accordance with one embodiment, a tag 216 may, for example, indicate the associated file type. In another embodiment, where a backup client 102 inserts its own metadata information into the data stream (e.g., header information), the additional information may also be separately tagged for identification. Tagging within the context of this disclosure refers to inclusion of an identifier or identifying field in the data stream to separate or distinguish different portions of the data stream.

In certain embodiments, the tags may not be included in the data stream, and may instead be placed in a different data structure transmitted in association with the data stream. In the exemplary embodiment of FIG. 2B, the tags 210, 212, 214 and 216 are embedded in the file data streams transmitted from backup client 102 to storage management server 108. By separating and identifying the associated streams 206 and the file data 208, a storage management server 108 may be configured to use the information to determine how to apply a deduplication algorithm to the received file data stream in an efficient manner.

Accordingly, the data structure illustrated in FIG. 2B provides a level of granularity to the file data stream so that the portions of the file data stream likely to be redundant (i.e., those portions of the data stream that are common to more than one data stream) can be identified and deduplicated intelligently (i.e., without having to resort to a brute force comparison scheme for identifying duplicate data).

For example, two users on two machines in a computer network may have the exact same document file (e.g., Microsoft Word document), but likely have different security information or access control lists (ACLs) associated with those files. These two files likely have identical file data (e.g., content) 208 but different associated streams (e.g., metadata) 206. In a network backup environment utilizing deduplication, the identifying tags shown in FIG. 2B may be utilized to facilitate efficient deduplication by taking advantage of the predictable similarities and differences in the files, as provided in further detail below.

Figure 3A:
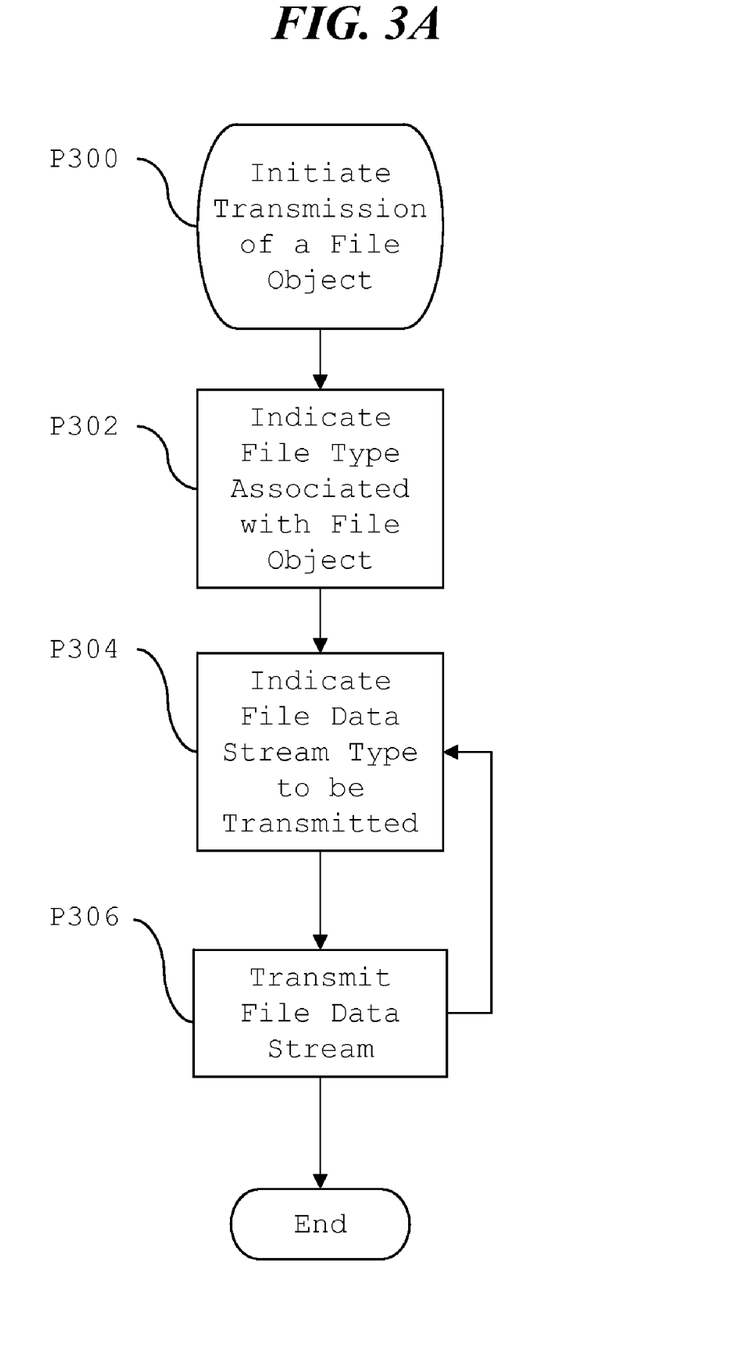
FIG. 3A is a flow diagram of an exemplary client-side communication protocol in accordance with one embodiment.

Referring now to FIG. 3A, an exemplary flow diagram of a client-side communication protocol in accordance with one embodiment is provided. The backup client 102 is configured to communicate with the storage management server 108 the nature of the file stream being transmitted so that the storage management server 108 can distinguish between file streams for deduplication purposes. The backup system communication protocol may be configured to allow the backup client 102 to initiate transmitting a file object 200 (P300).

In one embodiment, the backup client 102 may indicate the file type associated with the file object 200 being transmitted (P302). The file type may be designated by a tag 216 in the file object 200 to indicate the type of file being transmitted. For example, the file object 200 may comprise an email or a text file versus a media file (i.e., audio file, video file, image file, etc.). The likelihood of a successful deduplication between unrelated file types, such as a text file and an audio file, is small, while deduplication success rate among related file types is more probable. Distinguishing file types, thus, provides storage management server 108 with information that will eliminate the need for comparing a transmitted file of a first type with other files that are not of the same type, for the purpose of deduplication.

In some embodiments, the backup client 102 may also indicate the file data stream type being transmitted to the storage management server 108 (P304). For example, ACL data streams on a Windows system may be distinguished from a UNIX system data stream. The backup client 102 may thus transmit the file data stream to the storage management server 108 (P306), wherein a tag is associated with one or more file data streams to indicate the type of stream is being transmitted. Using such information, the deduplication process of the transmitted streams may be streamlined, by attempting to deduplicate data streams of the same type, and by passing on data streams that are not of the same type.

Figure 3B:
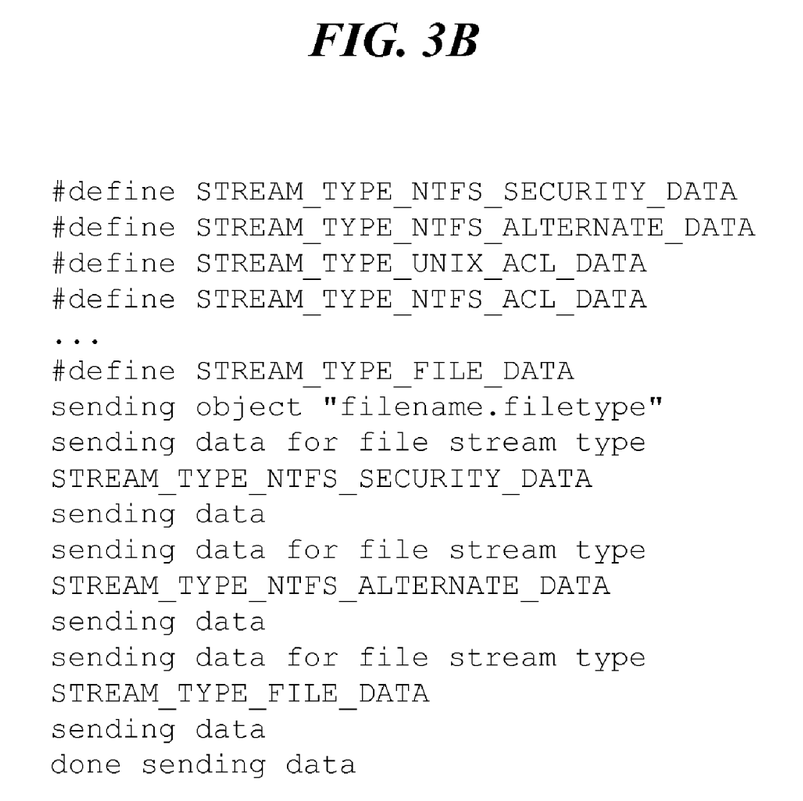
FIG. 3B illustrates exemplary pseudo-code for a client-side communication protocol in accordance with one embodiment.

In accordance with another embodiment, the backup client 102 may be further configured to also indicate the operating system (e.g., MS Windows, UNIX), file system (e.g., NTFS, FAT) or other attributes associated with the file object 200. Including this additional information may improve deduplication efficiency, because the likelihood of successful deduplication is greatest among data from similar operating systems, file systems, or file types. The client-side communication protocol of FIG. 3A may be implemented as shown in the exemplary pseudo-code illustrated in FIG. 3B, without limiting the scope of the invention to such exemplary embodiment.

Figure 4A:
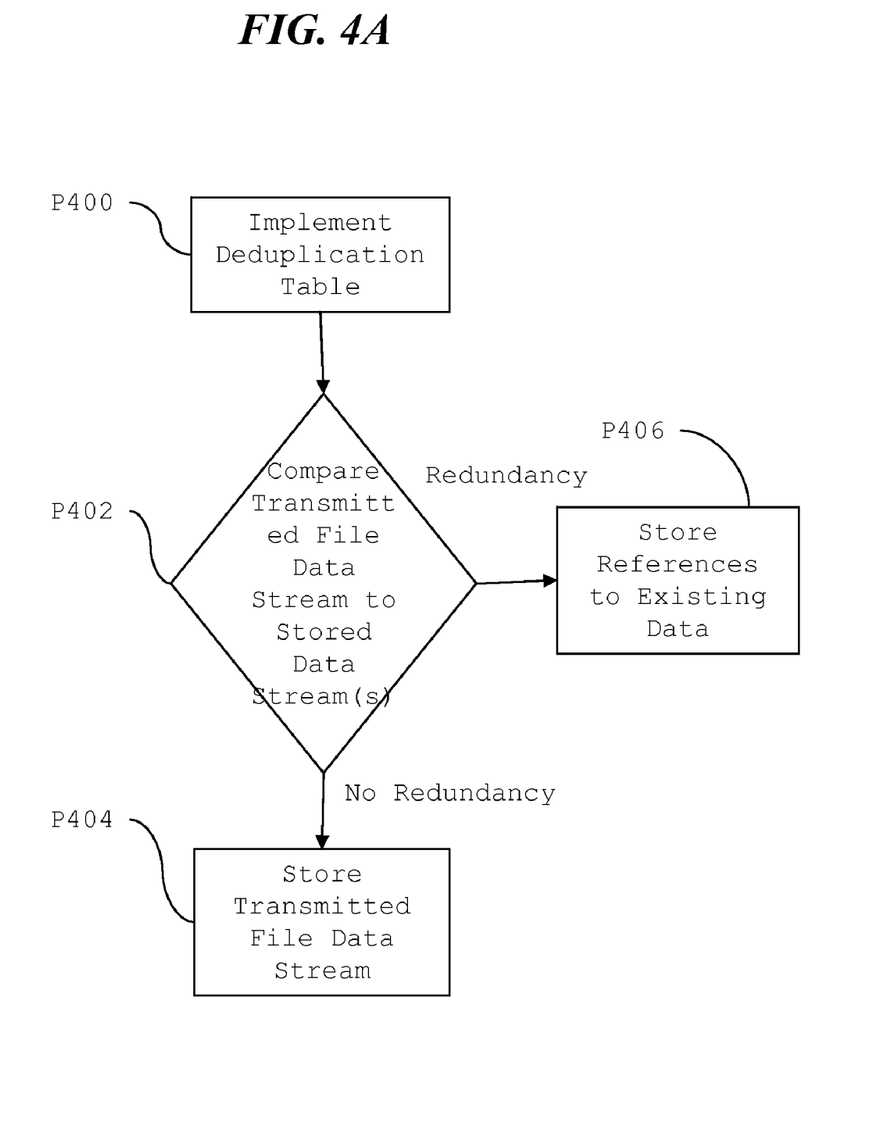
FIG. 4A is a flow diagram of an exemplary server-side implementation in accordance with one embodiment.

Referring now to FIG. 4A, the storage management server 108 may be configured to implement a deduplication data structure (e.g., table) for various file data streams (P400). The storage management server 108 may use the deduplication table to compare the transmitted file data stream with stored file data streams (P402). If there is no redundancy, the storage management server 108 may then store the transmitted file data stream in backup storage 112 (P404). Otherwise, the storage management server 108 will store references to the existing data, instead of storing a separate copy (P406).

In an exemplary embodiment, the storage management server 108 is configured to implement a deduplication table and compare the transmitted file data stream with stored file data streams by creating file data stream profiles. Profiles of file data streams may be created based on how efficiently two file data streams may deduplicate. Redundancies are more likely to occur among file data streams from similar sources (e.g., the same backup client 102 or user, the same file system, the same operating system, etc.) as opposed to file data streams generated from different sources.

Accordingly, in some embodiments, profiles are created to implement deduplication across namespaces on the same machine (e.g., across files from the same backup client 102 or user), across similar namespaces (e.g., across file data streams from the same file system or operating system), or across namespaces in general (e.g., across file data streams from a backup client 102, operating system, or file system). The storage management server 108 may be implemented to take advantage of predictable or highly probable redundancies according to the profiles.

Figure 4B:
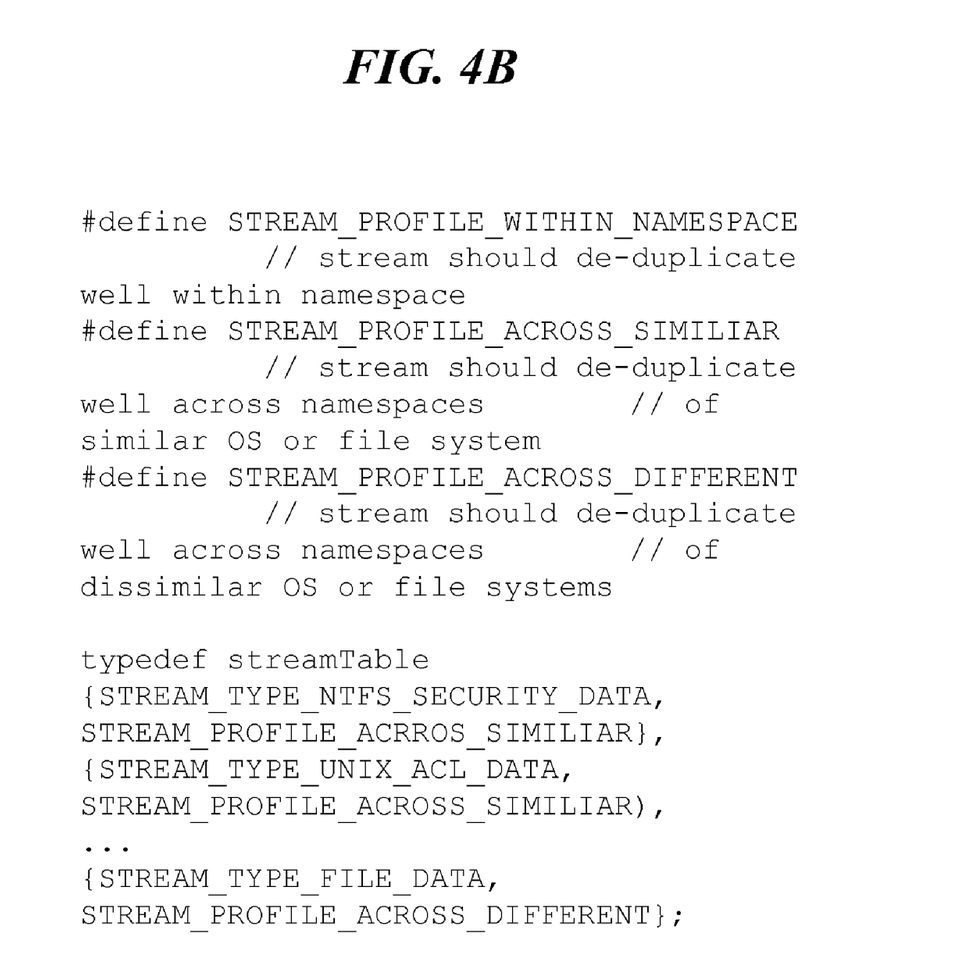
FIG. 4B illustrates exemplary pseudo-code for a server-side implementation in accordance with one embodiment.

For example, NTFS security data would be a good candidate for deduplication among file data streams from the same backup client 102 (within namespace on the same machine) because security data from the same machine is likely to be redundant. NTFS security data would also be a good candidate across other NTFS security data (across similar namespaces), because the streams are the same type of file from the same type of file system. However, NTFS security data would probably not be a good candidate for deduplication across namespaces in general, because redundancies are unlikely to occur unless the stored data stream is NTFS security data. The file data streams may be implemented as shown in the exemplary pseudo-code illustrated in FIG. 4B, without limiting the scope of the invention to such exemplary embodiment.

In one embodiment, the storage management server 108 may be further configured to use the file type information for deduplication to add another layer of intelligence by deduplicating file data 208 of file objects 200 having the same file type. For example, a storage management server 108 may determine file data 208 from a file object 200 containing email may be compared to other data streams corresponding to email because successful deduplication is more likely in such a scenario (e.g., where a sender mass emails the same content to 1000 other recipients; the storage management server 108 can use deduplication to store a single copy).

Accordingly, by indicating and separating the file data 208 and the alternate associated streams 206, it is possible to realize a higher level of efficiency in the deduplication process. By tagging each stream separately, stream types can be compared to same stream type across similar namespaces. Additionally, by identifying the stream types, unnecessary comparisons may be avoided.

In different embodiments, the invention can be implemented either entirely in the form of hardware or entirely in the form of software, or a combination of both hardware and software elements. For example, client node 100, server 106, backup client 102, and storage management server 108 may comprise a controlled computing system environment that can be presented largely in terms of hardware components and software code executed to perform processes that achieve the results contemplated by the system of the present invention.

Figure 5:
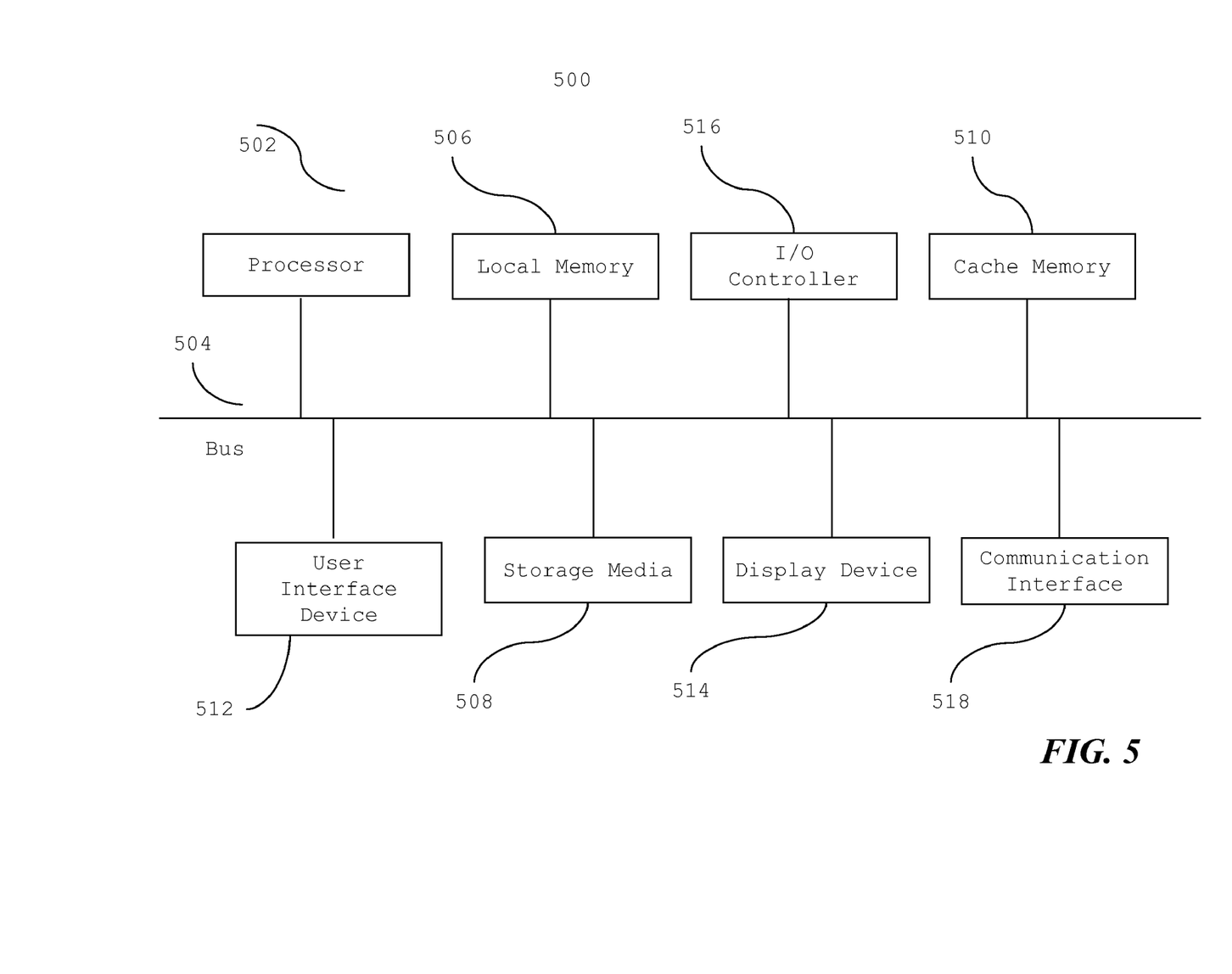
FIGS. 5 and 6 are block diagrams of hardware and software environments in which a system may operate, in accordance with one or more embodiments.
Figure 6:
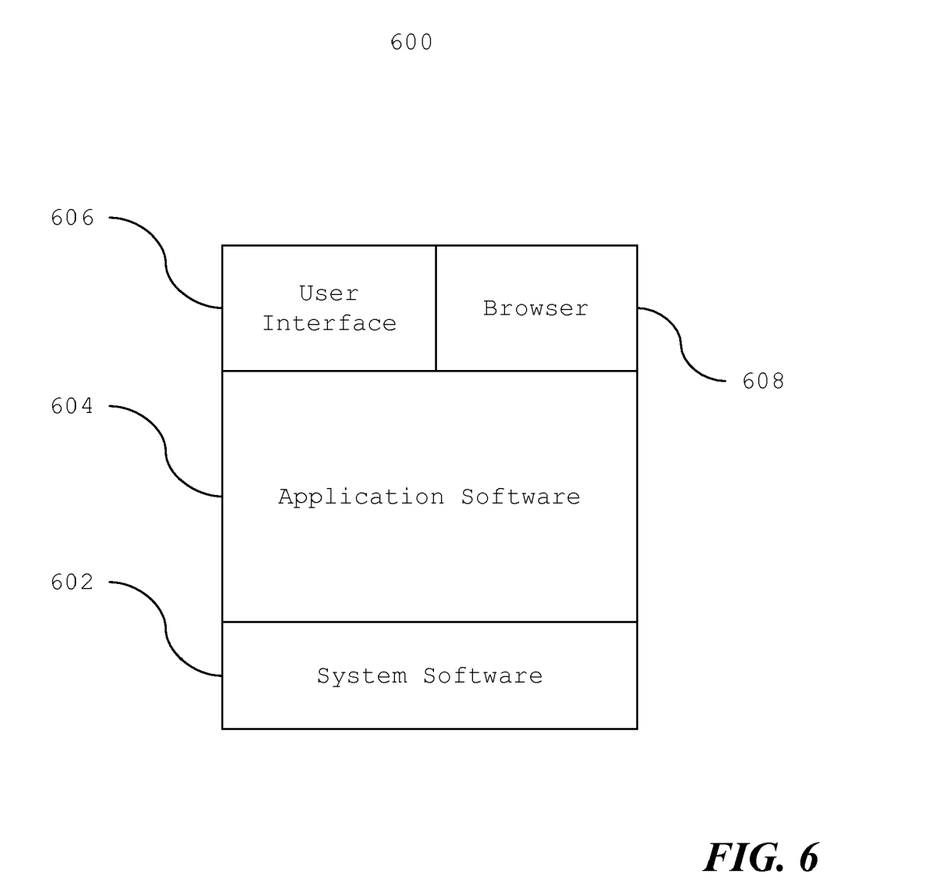

Referring to FIGS. 5 and 6, a computing system environment in accordance with an exemplary embodiment is composed of a hardware environment 500 and a software environment 600. The hardware environment 500 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 600 is divided into two major classes comprising system software 602 and application software 604. System software 602 comprises control programs, such as the operating system (OS) and information management systems that instruct the hardware how to function and process information.

In one embodiment, backup client 102 and storage management server 108 may be implemented as system software 602 or application software 604 executed on one or more hardware environments to facilitate data transmission among computing systems in a network 104. Application software 604 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 5, an embodiment of the system software 602 and application software 604 can be implemented as computer software in the form of computer readable code executed on a data processing system such as hardware environment 500 that comprises a processor 502 coupled to one or more computer readable media or memory elements by way of a system bus 504. The computer readable media or the memory elements, for example, can comprise local memory 506, storage media 508, and cache memory 510. Processor 502 loads executable code from storage media 508 to local memory 506. Cache memory 510 provides temporary storage to reduce the number of times code is loaded from storage media 508 for execution.

A user interface device 512 (e.g., keyboard, pointing device, etc.) and a display screen 514 can be coupled to the computing system either directly or through an intervening I/O controller 516, for example. A communication interface unit 518, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 500 may not include all the above components, or may comprise other components for additional functionality or utility. For example, hardware environment 500 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 518 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 6, system software 602 and application software 604 can comprise one or more computer programs that are executed on top of an operating system after being loaded from storage media 508 into local memory 506. In a client-server architecture, application software 604 may comprise backup client 102 software and storage management server 108 software. For example, in one embodiment of the invention, backup client 102 software is executed on client 100 computing systems and storage management server 108 software is executed on a server 106 system.

Software environment 600 may also comprise browser software 608 for accessing data available over local or remote computing networks. Further, software environment 600 may comprise a user interface 606 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of backing up a data file from a first system to a second system, wherein the data file comprises first data and second data, the method comprising:
   identifying data included in the data file, prior to transmission of the data file in a data stream to the second system, such that the second system is able to distinguish the first data from the second data in the data file,
   wherein the first data comprises information stored in the data file as content that is to be backed up on storage media by the second system, and the second data comprises information defining one or more attributes associated with said content in the first data,
   wherein the second system processes the second data to determine whether content included in the first data is a candidate for deduplication, prior to comparing the content of the first data with third data, previously backed up on the storage media, to determine any redundancies between the content in the first data and the third data,
   wherein if processing the second data indicates that an attribute associated with the content in the first data is different from an attribute associated with the content in the third data, then content of the first data is not deduplicated with respect to the third data,
   wherein if processing the second data indicates that an attribute associated with the content in the first data is the same as an attribute associated with the content in the third data, then content of the first data is deduplicated with respect to the third data,
   such that portions of content in the first data that are non-redundant with respect to the third data are stored in the storage media by the second system, and portions of the content in the first data that are redundant with respect to the third data are not stored in the storage media and instead a reference pointer is provided to portions of the third data that include a copy of the redundant portions of the content in the first data, instead of duplicating the redundant portions of the content on the storage media,
   wherein the second data comprises metadata including attributes for identifying the content in the first data as belonging to a class, category or type, wherein the metadata is fixed in size, and
   wherein the second data further comprises associated stream data related to the content in the first data,
   wherein the associated stream data provides additional information about the content in the first data,
   wherein said additional information is not included in the metadata, wherein the associated stream data is not fixed in size,
   wherein the metadata is used to determine whether the associated stream data is to be deduplicated.

2. The method of claim 1 wherein the second data is used to classify the first data according to a plurality of data types, wherein the data types provide information about operating environment associated with the first system, wherein the second system processes the first data according to the data types to select the third data with which to compare the first data for the purpose of deduplication.

3. The method of claim 1 wherein the second data is used to classify the first data according to a plurality of data types, wherein the data types provide information about data categories to which the first data may belong, wherein the second system processes the first data according to the data types to select the third data with which to compare the first data for the purpose of deduplication.

4. The method of claim 2, wherein the information about the operating environment comprises information about the first system's operating system.

5. The method of claim 2, wherein the information about the operating environment comprise information about the first system's file system.

6. The method of claim 3, wherein the data categories identify nature of the content in the first data.

7. The method of claim 6, wherein the nature of the content may be identified as multimedia or text.

8. The method of claim 6, wherein the nature of the content may be identified according to software application utilized to create the content.

9. A storage management system comprising:
   a first system communicatively coupled to a network, such that the first system may transmit a data file to a second system communicatively coupled to the network, wherein the data file comprises first data and second data, said first system configured to identify data included in the data file, prior to transmission of the data file in a data stream to the second system, such that the second system is able to distinguish the first data from the second data in the data file,
   wherein the first data comprises information stored in the data file as content that is to be backed up on storage media by the second system, and the second data comprises information defining one or more attributes associated with said content in the first data,
   wherein the second system processes the second data to determine whether content included in the first data is a candidate for deduplication, prior to comparing the content of the first data with third data, previously backed up on the storage media, to determine any redundancies between the content in the first data and the third data,
   wherein if processing the second data indicates that an attribute associated with the content in the first data is different from an attribute associated with the content in the third data, then content of the first data is not deduplicated with respect to the third data,
   wherein if processing the second data indicates that an attribute associated with the content in the first data is the same as an attribute associated with the content in the third data, then content of the first data is deduplicated with respect to the third data,
   such that portions of content in the first data that are non-redundant with respect to the third data are stored in the storage media by the second system, and portions of the content in the first data that are redundant with respect to the third data are not stored in the storage media and instead a reference pointer is provided to portions of the third data that include a copy of the redundant portions of the content in the first data, instead of duplicating the redundant portions of the content on the storage media, wherein the second data comprises metadata including attributes for identifying the content in the first data as belonging to a class, category or type, wherein the metadata is fixed in size, and wherein the second data further comprises associated stream data related to the content in the first data, wherein the associated stream data provides additional information about the content in the first data, wherein said additional information is not included in the metadata, wherein the associated stream data is not fixed in size, wherein the metadata is used to determine whether the associated stream data is to be deduplicated.

10. The storage management system of claim 9 wherein the second data is used to classify the first data according to a plurality of data types, wherein the data types provide information about operating environment associated with the first system, wherein the second system processes the first data according to the data types to select the third data with which to compare the first data for the purpose of deduplication.

11. The storage management system of claim 9 wherein the second data is used to classify the first data according to a plurality of data types, wherein the data types provide information about data categories to which the first data may belong, wherein the second system processes the first data according to the data types to select the third data with which to compare the first data for the purpose of deduplication.

12. The storage management system of claim 10, wherein the information about the operating environment comprises information about the first system's operating system.

13. The storage management system of claim 10, wherein the information about the operating environment comprises information about the first system's file system.

14. The storage management system of claim 11, wherein the data categories identify nature of the content in the first data.

15. A computer program product comprising a non-transitory computer readable storage medium including computer usable program code for transmitting a data file from a first system to a second system, said computer program product including:

computer usable program code for identifying data included in the data file, prior to transmission of the data file in a data stream to the second system, such that the second system is able to distinguish the first data from the second data in the data file, wherein the first data comprises information stored in the data file as content that is to be backed up on storage media by the second system, and the second data comprises information defining one or more attributes associated with said content in the first data, wherein the second system processes the second data to determine whether content included in the first data is a candidate for deduplication, prior to comparing the content of the first data with third data, previously backed up on the storage media, to determine any redundancies between the content in the first data and the third data, wherein if processing the second data indicates that an attribute associated with the content in the first data is different from an attribute associated with the content in the third data, then content of the first data is not deduplicated with respect to the third data, wherein if processing the second data indicates that an attribute associated with the content in the first data is the same as an attribute associated with the content in the third data, then content of the first data is deduplicated with respect to the third data, such that portions of content in the first data that are non-redundant with respect to the third data are stored in the storage media by the second system, and portions of the content in the first data that are redundant with respect to the third data are not stored in the storage media and instead a reference pointer is provided to portions of the third data that include a copy of the redundant portions of the content in the first data, instead of duplicating the redundant portions of the content on the storage media, wherein the second data comprises metadata including attributes for identifying the content in the first data as belonging to a class, category to type, wherein the metadata is fixed in size, and wherein the second data further comprises associated stream data related to the content in the first data, wherein the associated stream data provides additional information about the content in the first data, wherein said additional information is not included in the metadata, wherein the associated stream data is not fixed in size, wherein the metadata is used to determine whether the associated stream data is to be deduplicated.

16. The computer program product of claim 15 wherein the second data is used to classify the first data according to a plurality of data types, wherein the data types provide information about operating environment associated with the first system, wherein the second system processes the first data according to the data types to select the third data with which to compare the first data for the purpose of deduplication.

17. The computer program product of claim 16 wherein the second data is used to classify the first data according to a plurality of data types, wherein the data types provide information about data categories to which the first data may belong, wherein the second system processes the first data according to the data types to select the third data with which to compare the first data for the purpose of deduplication.

* * * * *